(12) United States Patent
Halsey

(10) Patent No.: US 9,255,599 B1
(45) Date of Patent: Feb. 9, 2016

(54) NUT TIGHTENING SYSTEM

(71) Applicant: John T. Halsey, Pensacola, FL (US)

(72) Inventor: John T. Halsey, Pensacola, FL (US)

(*) Notice: Subject to any disclaimer, the term of this patent is extended or adjusted under 35 U.S.C. 154(b) by 0 days.

(21) Appl. No.: 14/079,405

(22) Filed: Nov. 13, 2013

(51) Int. Cl.
*F16B 39/10* (2006.01)

(52) U.S. Cl.
CPC ..................... *F16B 39/10* (2013.01)

(58) Field of Classification Search
CPC ........ F16B 31/04; F16B 31/101; F16B 31/14; F16B 31/20
USPC ............. 411/6, 119, 120, 204, 262, 299, 438, 411/999
See application file for complete search history.

(56) References Cited

U.S. PATENT DOCUMENTS

| | | | | |
|---|---|---|---|---|
| 82,473 A * | 9/1868 | Olney et al. | ............. | F16B 31/04 411/350 |
| 95,897 A * | 10/1869 | Griswold | ................ | F16B 39/20 411/87 |
| 167,469 A * | 9/1875 | Perry | ................... | F16B 39/101 411/88 |
| 168,483 A * | 10/1875 | Hamilton | ............. | F16B 39/101 411/88 |
| 421,960 A * | 2/1890 | McLimans | ............ | F16B 39/101 411/88 |
| 482,906 A * | 9/1892 | Perry | ................... | F16B 39/101 411/88 |
| 493,122 A * | 3/1893 | Schoaf | .................... | F16B 39/10 411/120 |
| 506,231 A * | 10/1893 | Hester | ................... | F16B 39/101 411/88 |
| 517,534 A * | 4/1894 | Wright | .................. | F16B 39/101 411/88 |
| 716,395 A * | 12/1902 | Ebersole | ............... | F16B 39/101 411/96 |
| 1,725,790 A * | 8/1929 | Halagarda | ............... | F16B 39/10 411/87 |
| 1,861,532 A * | 6/1932 | Hough | .................... | G09F 13/26 174/138 H |
| 3,806,992 A | 4/1974 | Reimer | | |
| 4,657,457 A * | 4/1987 | Rickwood | ............. | F16B 39/101 29/525.01 |
| 4,721,306 A | 1/1988 | Shewchuk | | |
| 5,364,214 A | 11/1994 | Fazekas | | |
| 5,522,688 A | 6/1996 | Reh | | |
| 5,540,530 A | 7/1996 | Fazekas | | |
| 6,880,433 B1 * | 4/2005 | Tanimura | ................ | F16B 31/04 411/119 |
| 7,037,060 B2 | 5/2006 | Commins | | |
| 7,316,533 B2 * | 1/2008 | Tanimura | ................ | F16B 39/20 411/119 |
| 7,905,066 B2 | 3/2011 | Pryor | | |
| 2007/0001451 A1 | 1/2007 | Struven | | |
| 2009/0324364 A1 | 12/2009 | Smith | | |
| 2011/0113711 A1 | 5/2011 | Espinosa | | |

* cited by examiner

*Primary Examiner* — Roberta Delisle
(74) *Attorney, Agent, or Firm* — Joe D. Calhoun

(57) ABSTRACT

A system for applying rotational torque to a fastener on a fastening member (such as a threaded rod) to maintain the tight fastening. One specific embodiment of the system uses a recoil spring to apply such torque directly to the fastener; the system enables continued tightening of the fastener long after the initial fastening occurs.

14 Claims, 15 Drawing Sheets

NUT TIGHTENING SYSTEM

CROSS REFERENCE TO RELATED APPLICATIONS

This is a continuation-in-part application claiming the benefit of the filing date of co-pending U.S. utility patent application Ser. No. 13/730,663 filed 28 Dec. 2012, the disclosure of which is incorporated herein by reference.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention relates to the field of building construction or improvement. More particularly, the invention disclosed herein is essentially a device for assuring that the nut remains tight against the cap-plate, as the structural frame shortens. Although the invention has several embodiments, it essentially is a system for rotating a nut on the threaded tip of an anchored rod to maintain tight contact between the nut and the cap-plate (or a washer abutting a surface anchored by the rod).

(2) Background of Invention

There are many situations requiring application of rotational torque upon a fastener, to maintain the tightness of the fastening long after the initial fastening. One example of such a situation involves the need to tighten a nut fastening two structural elements together after one or both structural elements have shrunken from dehydration. For example, lumber used for construction materials typically contains higher moisture when the structure is first constructed, compared to the moisture content after the structure has been constructed for a period of time. This is especially true when the lumber has been newly treated with preservatives and chemicals to withstand moisture. The internal moisture content of the wood construction elements decreases with the passage of time. This process, along with the compression caused by the weight of the structure bearing down on the wood units, eventually results in the shrinkage of the wood units (sometimes called "settling"). The process is most active during the first couple of years, and can result in a 5-6% decrease in the dimensions of wood units; then the process continues for several more years at a slower rate. As a result, many wooden units attached to each other lose their tight connections, thereby potentially creating a danger during the occurrence of catastrophic events such as hurricanes, tornadoes, strong wind and storms, or earthquakes. Maintenance of the tight connections will reduce or prevent damage caused by the repetitive shaking of the structures during the aforementioned catastrophic events contact between the nut and the cap-plate (or a washer abutting a surface anchored by the rod).

The invention is essentially a device to maintain tension between the nut and plate (or washer) on a structural frame when the preservative-treated lumber dries and shrinks over time. Typical construction methods include anchoring the frame of a structure to the foundation of the structure. One such method includes a rod, anchored to the foundation and extending through the lower horizontal base plate of the wall and upward through the uppermost wooden cap-plate and terminating in a nut tightened atop the cap-plate. As the structural frame dries over time (and after the roof is added), shortening of the wall joists often results in a gap of at least a few inches between the cap-plate and the once-tight nut. Such gaps enable high winds to vibrate or move the structure on its foundation, often increasing the gap until the structure can be destroyed or greatly damaged by movement by the wind.

A wide variety of tie-down or take-up systems have been developed to assure that the structural elements remain tightly connected. Known in the art are the following patents and published applications, arguably related to the patentability of the present invention:

| U.S. Pat. /App. Pub. No. | 1st Named Inventor | Date of Patent/Publication |
| --- | --- | --- |
| 3,806,992 | Reimer | Apr. 30, 1974 |
| 4,721,306 | Shewchuk | Jan. 26, 1988 |
| 5,364,214 | Fazekas | Nov. 15, 1994 |
| 5,522,688 | Reh | Jun. 4, 1996 |
| 5,540,530 | Fazekas | Jul. 30, 1996 |
| 7,037,060 | Commins | May 2, 2006 |
| 2007/0001451 | Struven | Jan. 4, 2007 |
| 2009/0324364 | Smith | Dec. 31, 2009 |
| 7,905,066 | Pryor | Mar. 15, 2011 |
| 2011/0113711 | Espinosa | Jul. 20, 2010 |

U.S. Pat. Nos. 5,364,214 and 5,540,530 issued to Fazekas disclose a self-adjusting tiedown system having a spring as a retainer, rather than to tighten the nut. These patents disclose a pair of opposing wedges that slide relative to each other, to increase in height to occupy any gap that arises between the nut and the top plate.

U.S. Pat. No. 7,037,060 issued to Commins discloses a shrinkage compensator assembly having an internal compression spring interposed between an innermost base cylinder and an outer sliding cylinder, to urge the sliding cylinder upward to increase the height of the assembly.

U.S. Patent Application Publication No. 2007/0001451 filed by Struven discloses a spring loaded nut for retaining a tubing connection with the tapered end of a vessel fitting. A compression spring within the nut housing biases a ferrule to maintain the tubing in tight engagement with the tapered end of the vessel fitting, to prevent leakage from the vessel through the fitting.

U.S. Patent Application Publication No. 2009/0324364 filed by Smith discloses a self-adjusting shrinkage compensation device having four nut segments around a threaded rod, and coiled spring members flexibly holding the segments against the rod.

None of the above listed references discloses a self-tightening nut assembly, in which the nut automatically rotates around (and down) the threaded tip of a rod to maintain a tightened abutment with whatever the rod is being deployed to hold snug in place. More particularly, none of the above listed references discloses a self-tightening fastener system comprising a wire or line attached to and wound around a nut and attached to a tightening means actuated by a recoil spring.

BRIEF SUMMARY OF THE INVENTION

The invention is essentially a device for assuring that a nut remains tight against the washer and top plate or similar structural elements or substrata, as the structural frame shortens. Although the invention has several embodiments, one general embodiment comprises a self-tightening rotary fastener (such as a nut) for the externally threaded portion of the fastening member (such as a threaded rod), for maintaining a snug fastening between said fastener and the substratum associated therewith. In this embodiment, said fastener includes an internally threaded fastener means rotationally engageable with the fastening member; also included are a tightening means for applying rotational force directly to said fastener means, and a stop means for preventing counter-rotation of said tightening means in a tightened state.

Alternatively, it essentially is a system for rotating a standard nut on the threaded tip of an anchored rod to maintain tight contact between the nut, washer and top plate. In general, the system comprises (includes) a device for tightening the rotary fastener (such as a nut) on the threaded tip of the fastening member (such as a threaded rod), for maintaining a tight connection between the structural element(s) associated with the rotary fastener and the fastening member, said device comprising:

(a) a coupling means for coupling the device to the rotary fastener;

(b) a tightening means for applying rotational force directly to said coupling means for rotating the rotary fastener; and (c) a chocking means for chocking and unchocking said tightening means in a rotated state. The invention may further include a stop means for preventing rotation of said tightening means after unchocking of said chocking means.

Another embodiment of the invention includes, in general:

(1) a nut rotatingly travelable above the threaded tip of the rod, the nut having an outer configuration for spooling wire wound around the nut;

(2) a wire, attached at one end to the spooling-nut, and wound around the spool in the same direction as the threads of the nut so that unwinding pulling of the wire will cause tightening rotation of the nut down the threaded tip of the rod; and (3) an extension spring having one end connected to the unattached end of the spooled wire, and having an opposite second end anchored a sufficient distance away to stretch the extension spring an amount sufficient to unwindingly pull the spooled wire enough to rotate the spooling-nut enough to maintain tight contact with the substratum. To deploy this embodiment of the self-tightening system, the user winds the wire around the spooling-nut (in the same direction as the threads), then screws the spooling-nut down the end of the threaded rod until it tightly abuts the washer on the top plate. The user then anchors the spring actuation mechanism (either extension spring or recoil spring-nut), and attaches the free end of the wound wire to the spring actuation mechanism. As the treated lumber dries and shrinks, the spring actuation mechanism causes the nut to rotate and maintain its tightened abutment against the washer on the top plate.

One primary object of the present invention is to provide an uncomplicated means of continuing the direct application of rotary torque to a fastener after the initial tightening of the fastener.

Another benefit of the invention disclosed herein is to provide a self-tightening system that is easy to make and use.

Another benefit of the present invention is to provide a system to maintain snug contact between the nut and top plate (or a washer), which may be anchored by a threaded rod through the bottom plate to the foundation.

Another object of the present invention is to provide a self-tightening fastener system capable of maintaining a snug fastening despite substratum shrinkage or other movement of more than an inch or two.

The invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The term "chock" or derivative thereof essentially means to stop, especially to stop the rotation of an element around an axis.

The term "fastener" or derivative thereof essentially means any fastener rotationally engageable with another fastening member, such as (for example) a nut with a threaded rod.

The term "threaded rod" or derivative thereof essentially means an externally threaded element or portion thereof capable of accepting rotational engagement of the internally threaded portion of a nut or similar fastener; it may be an element that is entirely threaded, or a bolt or a portion thereof having external threading.

The term "stanchion" or derivative thereof essentially means any element that may function as a stationary post or support.

Figure 1:
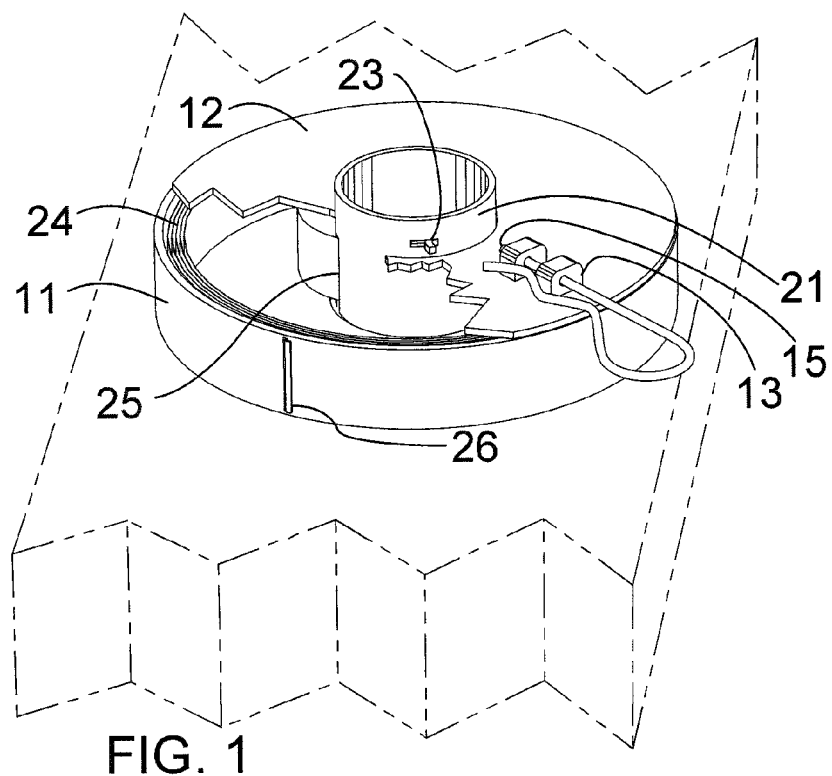
FIG. 1 depicts a perspective view of a representative sample of the invention mounted on a nut (not shown) anchoring a horizontal structural element or substratum (dashed lines). The device includes a recoil spring (24), within a housing (11) rotatably impaled upon an axle portion (21) of a coupling member having a coupling end (22) defining a coupling cavity (not shown); the housing lid has been partially removed to show that this recoil spring is in a relatively uncoiled state, having its inner end (25) anchored to an axle-slot (27) in the axle portion, and having its outer end (26) anchored to a housing-slot (28) in its housing. The axle portion includes a chocking means for temporarily chocking rotation of the housed recoil spring around the coupling member; this embodiment of the chocking means includes a flange (23) outstanding from the axle portion, and at least one yoke (13) fixed to the housing and having a bore accepting a chock-pin having a axial tip (15) engageable with the flange.
Figure 2:
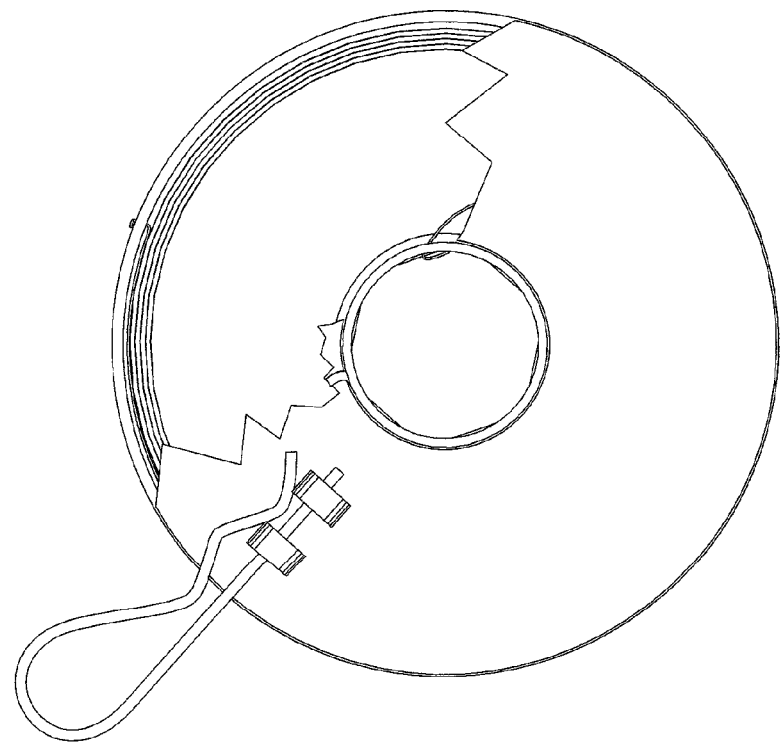
FIG. 2 depicts a top plan view of the invention of FIG. 1 (with its lid (12) partially cut away), absent the environmental elements.
Figure 3:
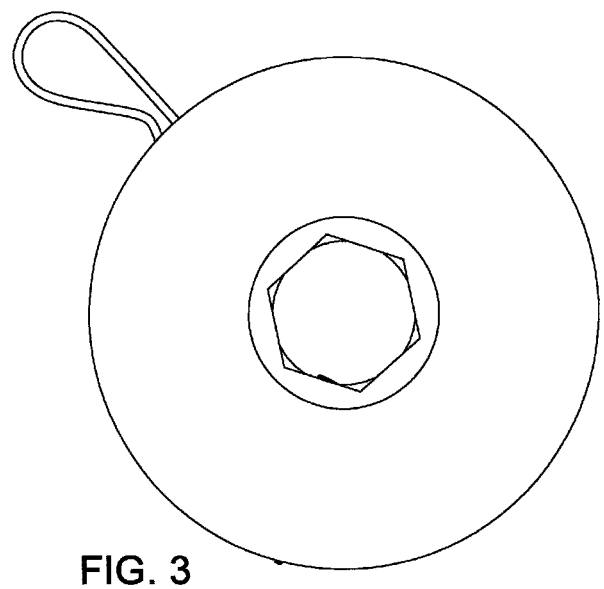
FIG. 3 depicts a bottom plan view of the invention of FIG. 1, absent the environmental elements.
Figure 4:
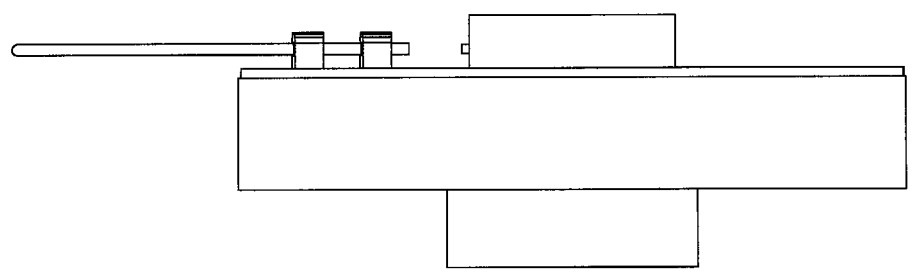
FIG. 4 depicts a first side elevation view of the invention of FIG. 1, absent the environmental elements.
Figure 5:
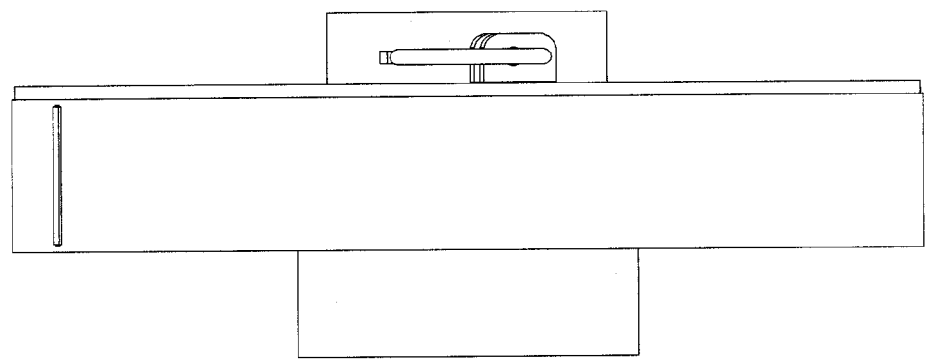
FIG. 5 depicts a second side elevation view of the invention of FIG. 1 (90° rotation from the view of FIG. 4), absent the environmental elements.
Figure 6:
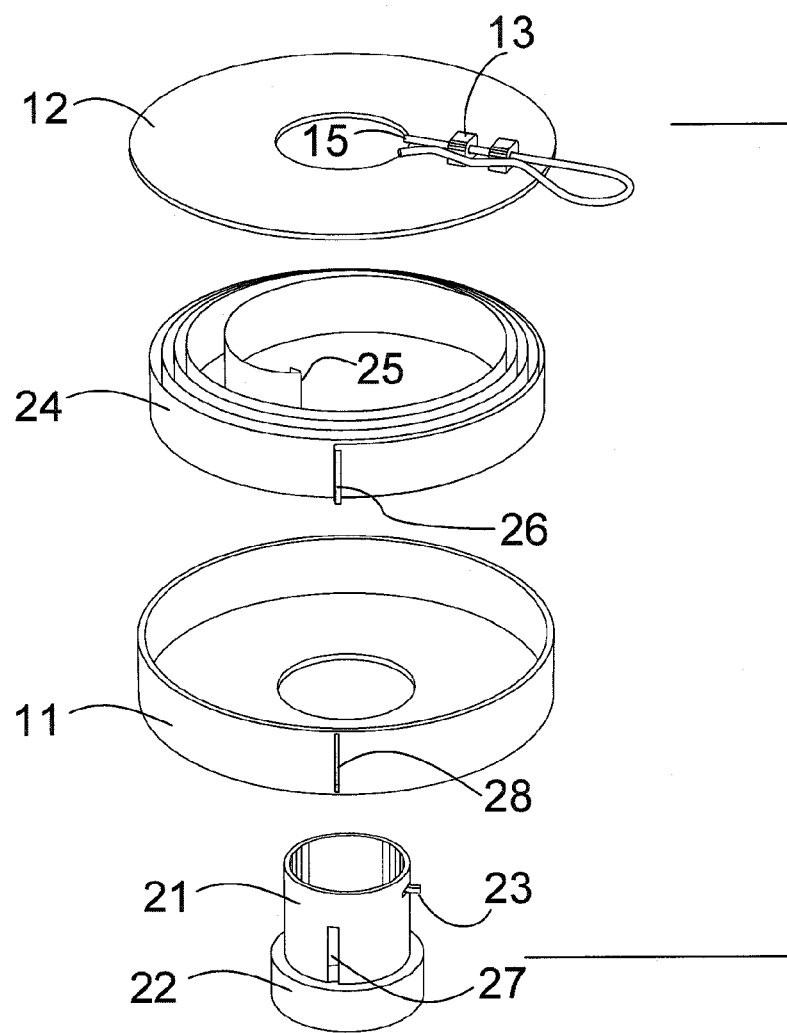
FIG. 6 depicts an exploded view of the parts of the invention of FIG. 1, absent the environmental elements. The lowermost part is a representative sample of a coupling portion having an axle slot (27) to accept the axial end of the recoil spring; the housing (11) (immediately above the coupling portion) includes a slot (28) accepting the peripheral end of the recoil spring.
Figure 7:
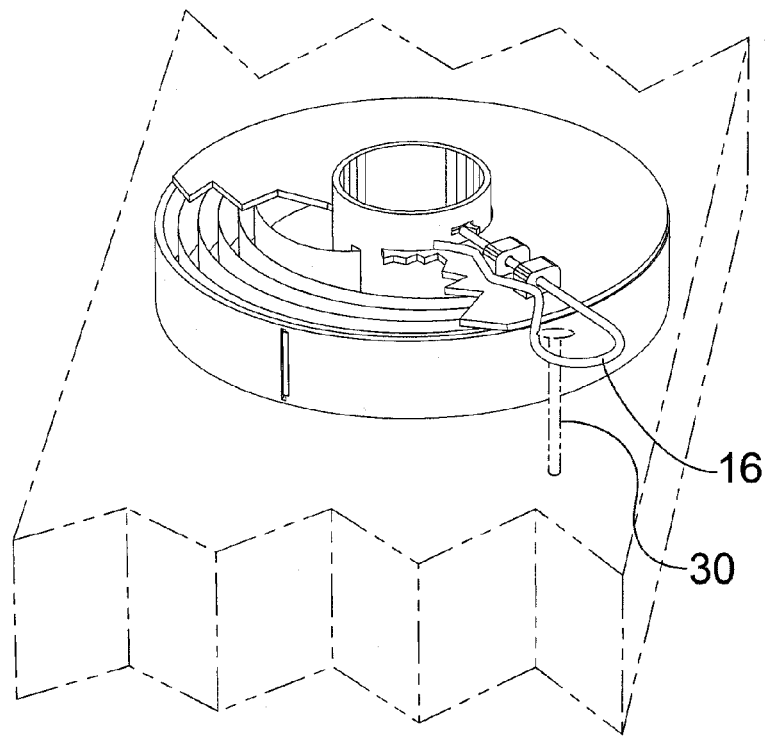
FIG. 7 depicts a perspective view of the invention of FIG. 1, with the recoil spring (24) in a tightly coiled state, with the axial tip (15) of the chock-pin engaged with the flange (23), and with the distal portion (16) of the chock-pin engaged with the stanchion (30). The device also includes a stop means for preventing rotation of the housed recoil spring relative to the horizontal structural element; this embodiment includes a stanchion (30) upstanding independently from the device and engageable with the distal portion (16) of the chock-pin, for preventing rotation of the housing after disengagement of the chock-pin from the flange, so that any torque will rotate the coupling portion to tighten the nut.
Figure 8:
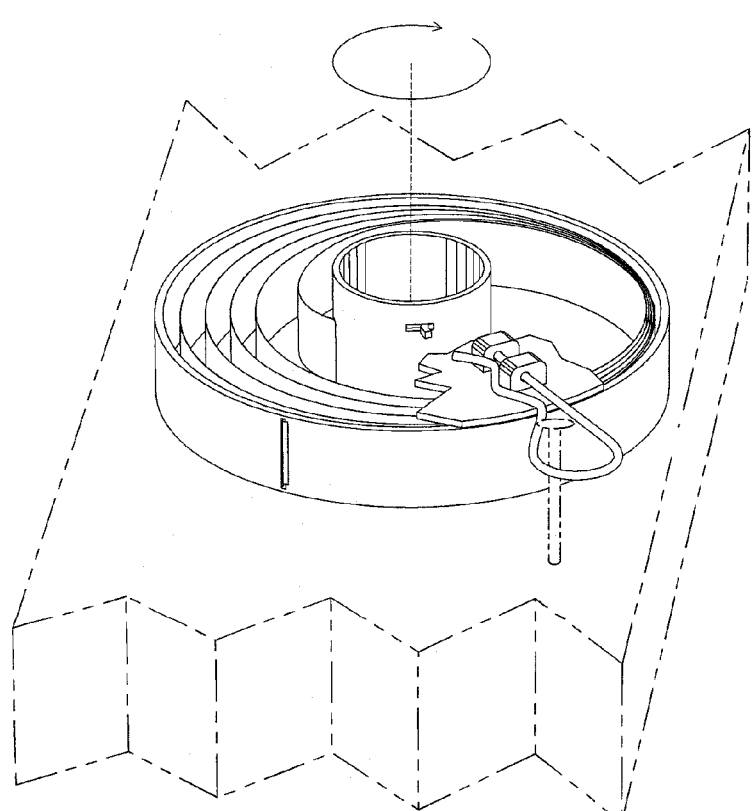
FIG. 8 depicts the same view as FIG. 7, except that the chock-pin has been moved to its unchocked position, and more of the lid of the housing has been cut away; the arrow above the axle portion shows the direction of the rotary torque exerted by the recoil spring after unchocking.
Figure 9:
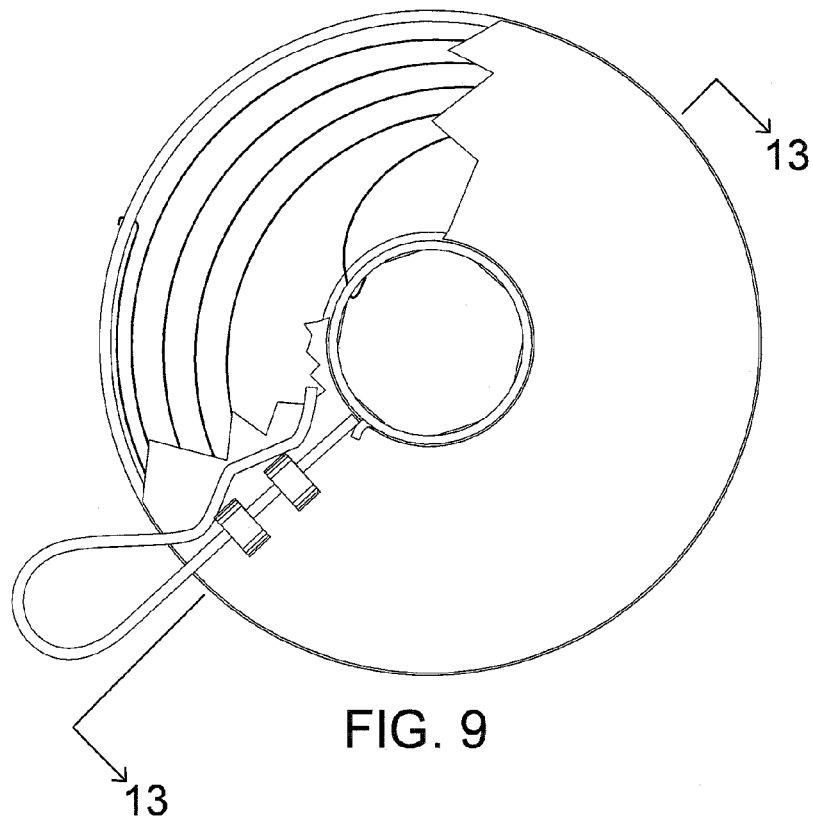
FIG. 9 depicts a top plan view of the invention of FIG. 7.
Figure 10:
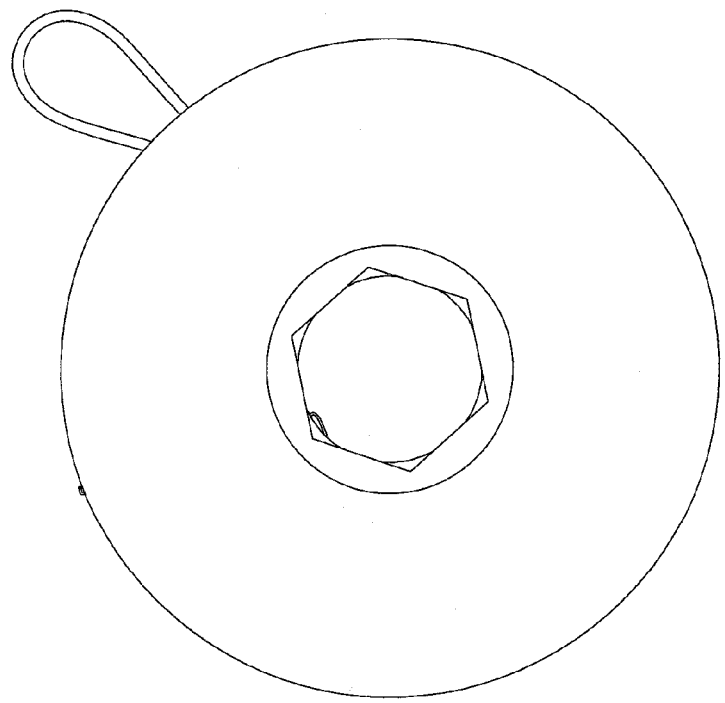
FIG. 10 depicts a bottom plan view of the invention of FIG. 7, absent the environmental elements.
Figure 11:
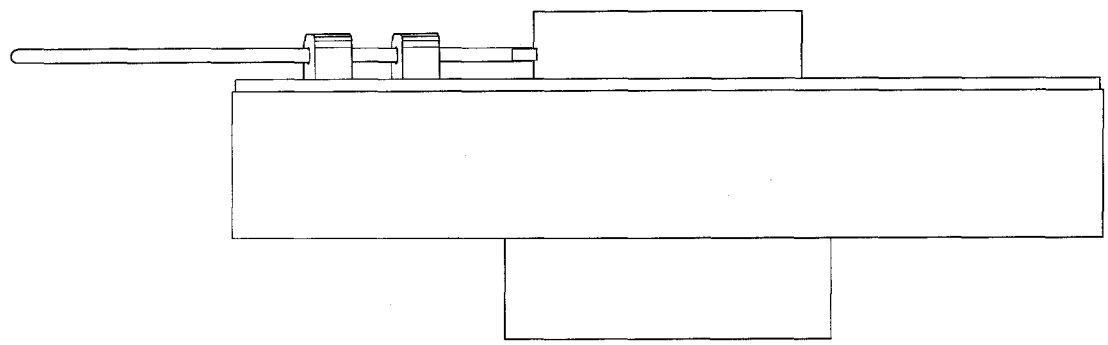
FIG. 11 depicts a first side elevation view of the invention of FIG. 7, absent the environmental elements.
Figure 12:
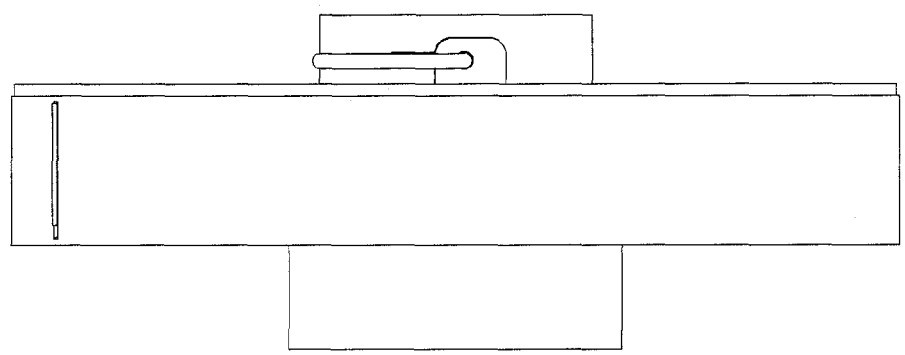
FIG. 12 depicts a second side elevation view of the invention of FIG. 7 (90° rotation from the view of FIG. 4), absent the environmental elements.
Figure 13:
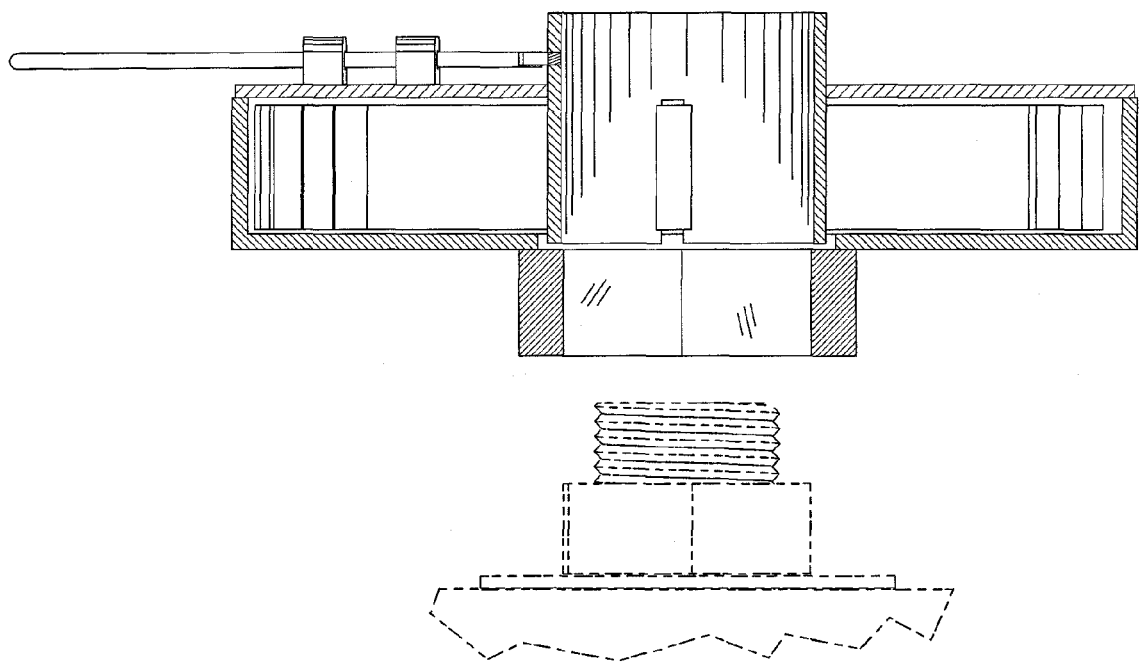
FIG. 13 depicts a cross-section view of the invention of FIG. 7, along the plane of 13-13 of FIG. 9; it is positioned above a representative sample of a nut and threaded rod (with washer atop a structural element), as if just prior to deployment atop the nut.
Figure 14:
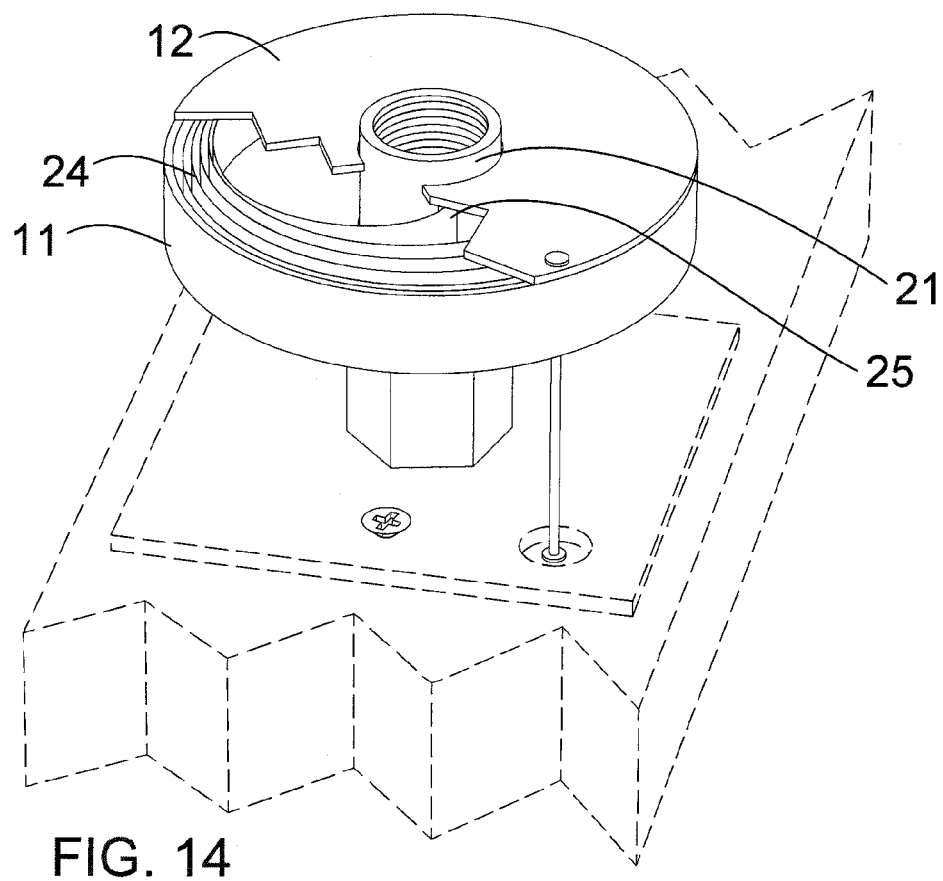
FIG. 14 depicts a perspective view of a representative sample of another embodiment of the invention having the nut incorporated into the coupling end, and with the stanchion (41) engaged within a void in substratum (dashed lines, in this case, a washer atop another substratum such as a wooden beam). The stanchion is engaged with the substratum when the recoil spring is tightly wound and ready to supply rotational force to the fastener portion of the system; the housing lid has been partially removed.
Figure 15:
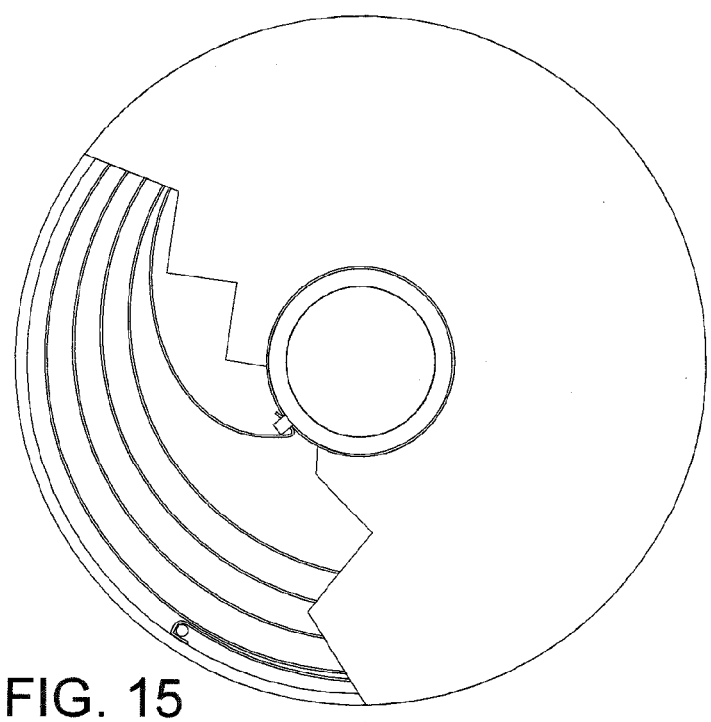
FIG. 15 depicts a top plan view of the invention of FIG. 14, except that the stanchion pin has been removed to show the aligned holes in the lid and bottom of the housing.
Figure 16:
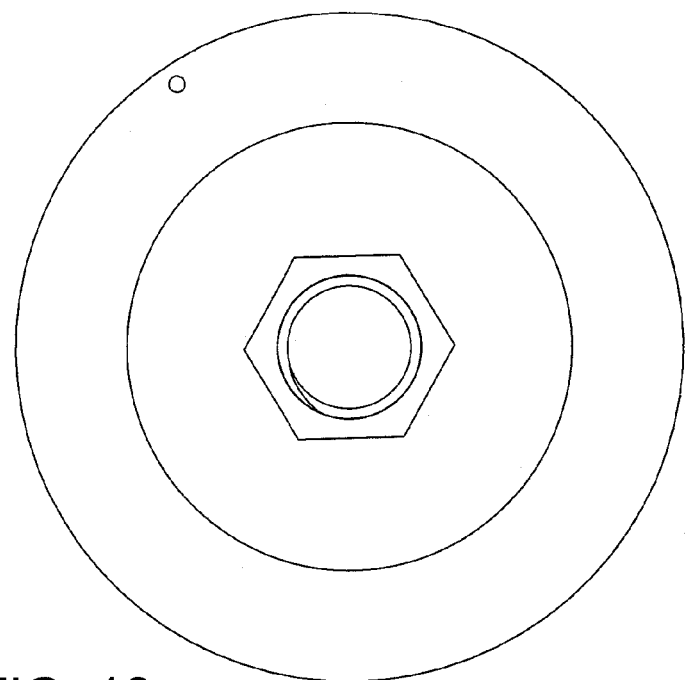
FIG. 16 depicts a bottom plan view of the invention of FIG. 15.
Figure 17:
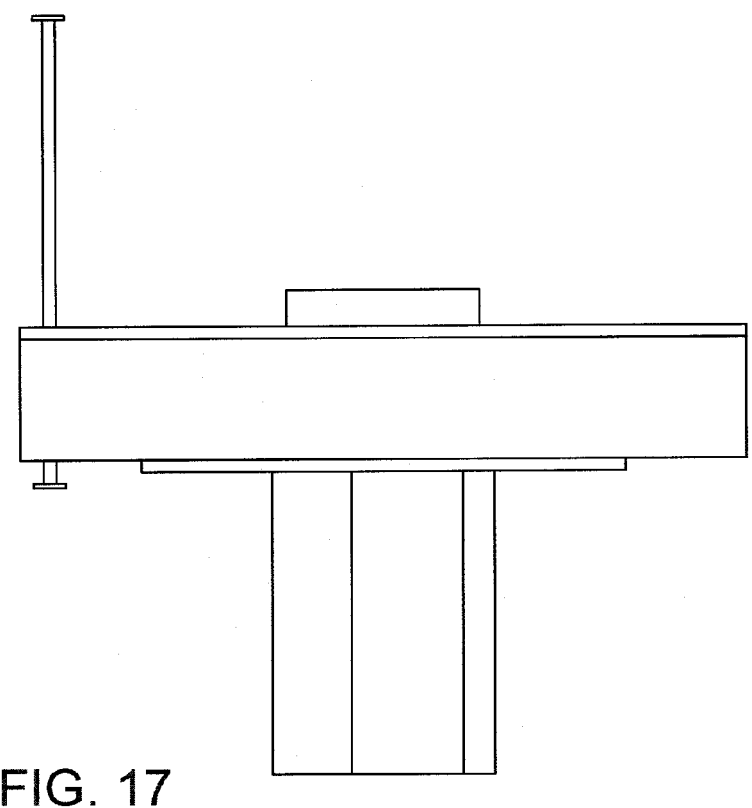
FIG. 17 depicts a side elevation view of the invention of FIG. 15, except that the stanchion has been added and positioned so that its upper end functions as a handle to facilitate winding the recoil spring (rather than the opposite end extended downwardly and engaging the substratum to prevent counter-rotation of the housing by the already-wound recoil spring).
Figure 18:
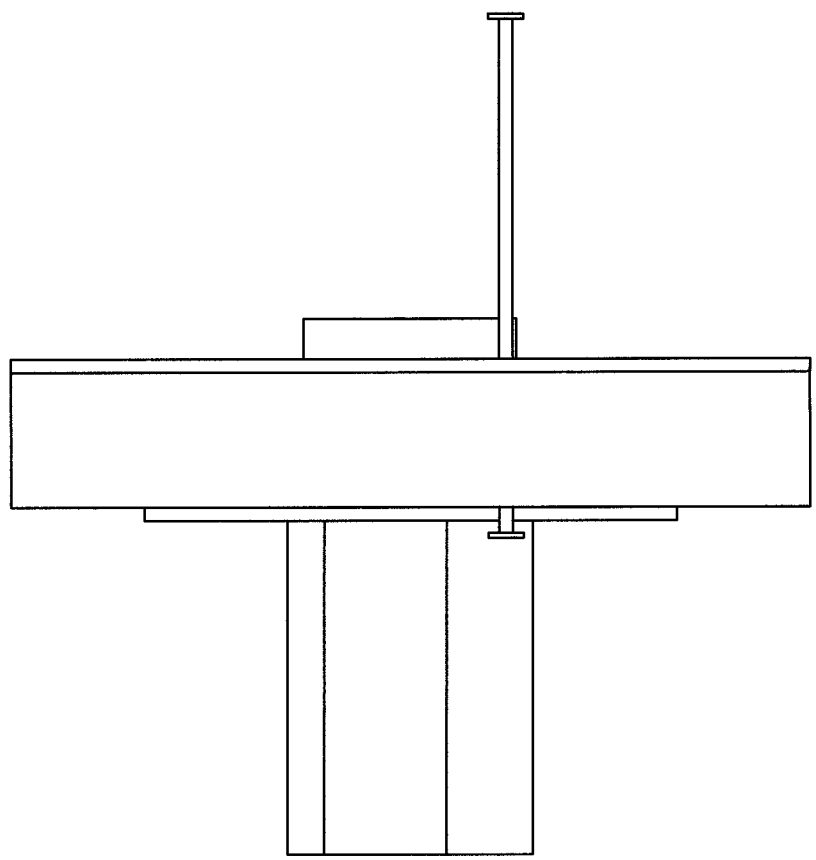
FIG. 18 depicts a second side elevation view of the invention of FIG. 17 (90° rotation from the view of FIG. 17).
Figure 19:
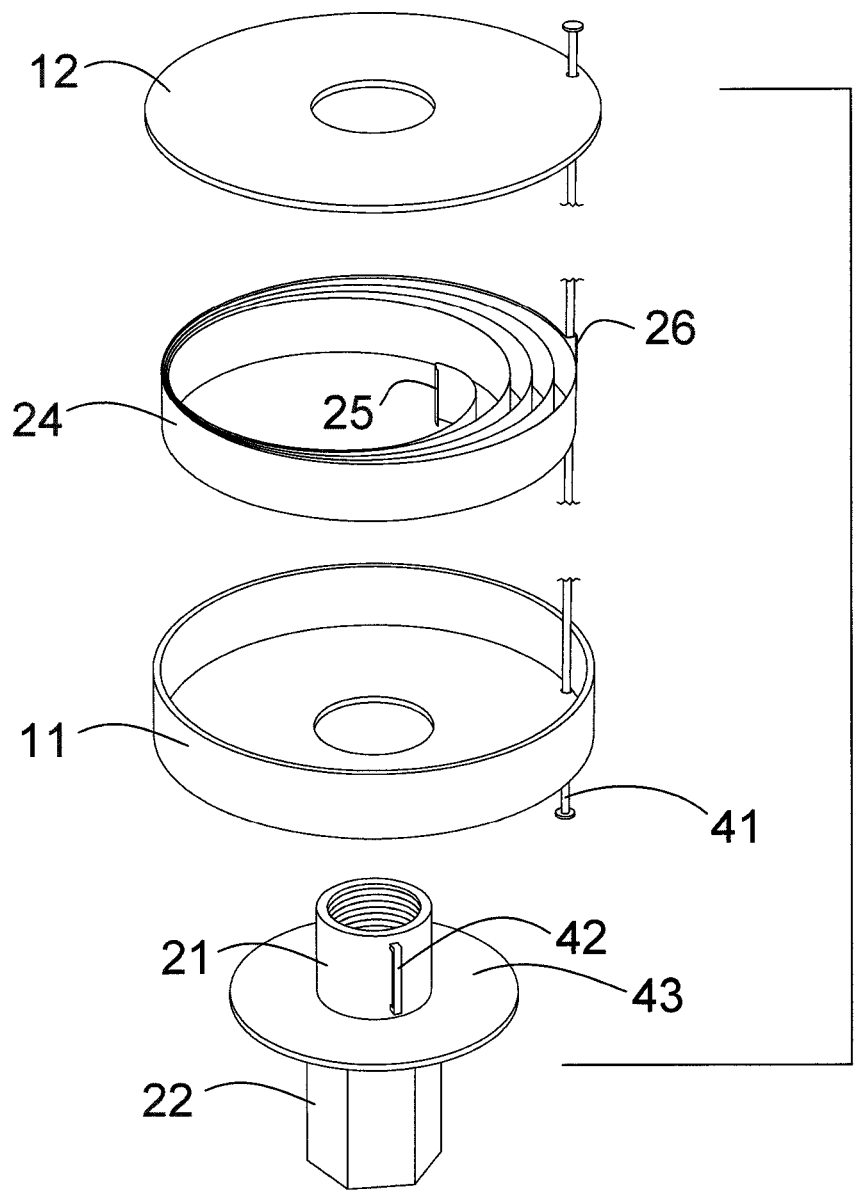
FIG. 19 depicts an exploded view of the parts of the invention of FIG. 14, absent the environmental elements. The lowermost part is a representative sample of internally threaded fastener means (22), an axle portion (21) with an anchor means (42) for the axial end of the recoil spring, and a support portion (43) to facilitate the carrying of the tightening means.

In general, one embodiment of the invention disclosed herein comprises a self-tightening rotary fastener (such as a nut) for the externally threaded portion of the fastening member (such as a threaded rod) for maintaining a snug fastening between said fastener and the substratum associated therewith. (See FIGS. 14-19.) In this embodiment, said fastener includes an internally threaded fastener means rotationally engageable with the fastening member; also included are a tightening means for applying rotational force directly to said fastener means, and a stop means for preventing counter-rotation of said tightening means in a tightened state.

The fastener means may include an axle portion for carrying said tightening means. A ledge or other outcropping between the round cross-sectioned axle portion and the non-round fastener portion facilitates the carrying of the tightening means. Alternatively, additional support such as a washer-like appendage may be engineered for that ledge. Moreover, said tightening means may include a recoil inner spring having an axial end anchored to said fastener means, and a peripheral end attached at a peripheral portion of a spring housing rotatably carried upon said axle portion. The peripheral end of said recoil spring may include a loop or similar structure to capture a middle portion of the stanchion extending (and travelable) through the housing. Rotation of said housing or counter-rotation of said fastener means causes said recoil spring to coil tighter into said tightened state.

The housing may have a lid with a hole, and a bottom with a hole aligned with said lid hole; both holes are sized to snugly accept a stanchion travelable therethrough and engageable with the substratum for preventing counter-rotation of said housing. The stanchion may have one end outstanding from said lid and facilitating counter-rotation of said housing, and an opposite engagement end engageable with the substratum. The engagement end may include an engagement tip insertable within a hole (or similar void) of the substratum. For example, there could be a metal plate between the internally threaded end of the fastener means and another substratum such as a wooden beam; the plate may have a hole in it, sized to accept the engagement end of the stanchion. Alternatively, the engagement end may have a point to facilitate being driven into wooden substratum. Alternatively, the engagement end may engage with a stop or similar structure upstanding on the substratum.

In one particular version of this embodiment, the self-tightening rotary fastener system comprises:

(a) an internally threaded fastener means rotationally engageable with the fastening member and comprising an axle portion;

(b) a tightening means comprising a recoil spring having an axial end anchored to said axle portion, and a peripheral end attached at a peripheral portion of a spring housing rotatably carried upon said axle portion, rotation of said housing or counter-rotation of said fastener means causing said recoil spring to coil tighter into a tightened state, said housing having a lid with a hole, and a bottom with a hole aligned with said lid hole; and (c) a stop means comprising a stanchion travelable through said aligned lid hole and bottom hole of said housing, and further comprising an engagement tip insertable within a void of the substratum for preventing counter-rotation of said housing.

To deploy this system, the user should first prepare the substratum stop for the stanchion when the device is installed. If the stopping method is engagement of the stanchion's engagement end with a void of the substratum, the user can create the void. One manner is to use a metal plate having a hole (sized to securely accept the engagement end), and position it between the internally threaded fastener end and the substratum; alternatively, the user may drill a similar hole in the substratum. If the stopping method is a stop or similar structure upstanding from the substratum (or intermediate plate), that stop structure may be readied for use. The user then positions the stanchion with its upper end more above the housing lid, and with its engagement end closest to the bottom of the housing. The user then rotates the internally threaded fastener end onto the end of the threaded rod (or other externally threaded fastening member), until the fastener end is tightened snugly against the substratum (including any intermediate plate). The user then grasps the stanchion and circularly rotates the housing so that the recoil spring is tightly wound within it. Lastly, the user depresses the stanchion until the engagement end engages either the void or the stop of the substratum.

In general, another embodiment of the invention disclosed herein comprises a device for tightening the rotary fastener (such as a nut) on the threaded tip of the fastening member (such as a threaded rod), for maintaining a tight connection between the structural element(s) associated with the rotary fastener and the fastening member, said device including (comprising) a coupling means for coupling the device to the rotary fastener, a tightening means for applying rotational force directly to said coupling means for rotating the rotary fastener, and a chocking means for chocking and unchocking said tightening means in a counter-rotated state. The coupling means may include a coupling portion defining a coupling cavity snugly accepting the rotary fastener; it could further include an axle portion for carrying said tightening means. The tightening means may include a recoil spring having an axial end anchored to said coupling means, and a peripheral end attached to a peripheral portion of a spring housing rotatably carried upon said axle portion. Counter-rotation of said housing, or rotation of said coupling means, may cause said inner spring to coil tighter into the counter-rotated state.

The housing may include a yoke on its outward surface, and the chocking means may include a chock-pin travelable through said yoke and engageable with a chocking portion of the coupling means. The chock-pin may include an axial tip; the chocking portion of the coupling means may include a portal accepting said axial tip of said chock-pin. The portal may be situated in the axle portion of said coupling means.

Alternatively, the chocking portion of the coupling means may include a protrusion outstanding from an outward surface of the axle portion, and engageable with the axial tip of the chock-pin. The protrusion may include a flange engageable with said axial tip of said chock-pin. The device may further include a stop means for preventing rotation of the tightening means after unchocking of the chocking means. The stop means may include a stanchion upstanding from the structure and engageable with said tightening means. For example, a nail may be hammered partially into the structural element near the housing, with the head of the nail sufficiently exposed to catch the distal portion (or loop) of the chock-pin to prevent further rotation thereof A more specific version of this embodiment of the invention includes:

(a) a coupling means comprising a coupling portion defining a coupling cavity snugly accepting the nut on the threaded rod, and comprising an axle portion and a chocking portion;

(b) a tightening rotation means comprising a recoil spring within a housing rotatably carried upon said axle portion, said spring having an axial end anchored to said axle portion, and a peripheral end attached to a peripheral portion of said housing, said housing having a yoke on its outward surface;

(c) a chocking means for chocking rotation of said rotation means, comprising a chock-pin travelable through said yoke and engageable with said chocking portion of said coupling means; and (d) a stop means for preventing rotation of said rotation means, comprising a stanchion upstanding from the structure and engageable with said rotation means.

The chock-pin may have an axial tip, said chocking portion of said coupling means comprising a portal accepting said axial tip of said chock-pin. The chock-pin may have an axial tip, said chocking portion of said coupling means comprising a protrusion engageable with said axial tip of said chock-pin. The protrusion may include a flange engageable with said axial tip of said chock-pin.

Figure 20:
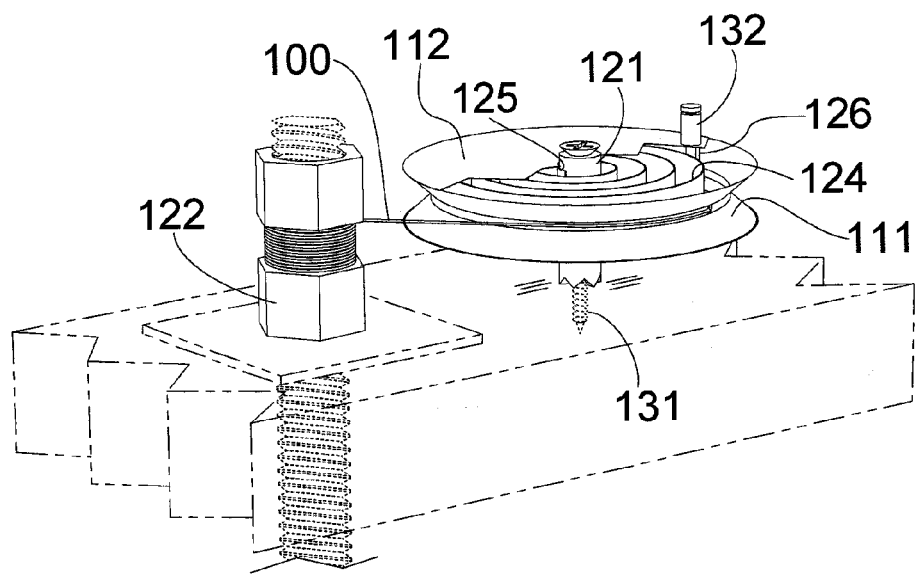
FIG. 20 depicts a perspective view of a representative sample of an alternative embodiment of the invented system including a spring-actuated spooling device and an engagement member mounted as a nut anchoring a horizontal structural element or substratum (dashed lines). The spring-actuated component includes a recoil spring (124), within a housing (111) rotatably impaled upon a stationary axle portion (121); the housing lid (112) has been partially removed to show that this recoil spring is in a partially uncoiled state, having its inner or axial end (125) anchored to an axle portion or sleeve (121), and having its outer or peripheral end (126) attached to the periphery of the housing. The anchor means includes a screw (131) or similar anchoring means for anchoring the spring-actuated spooling device to the substratum.
Figure 21:
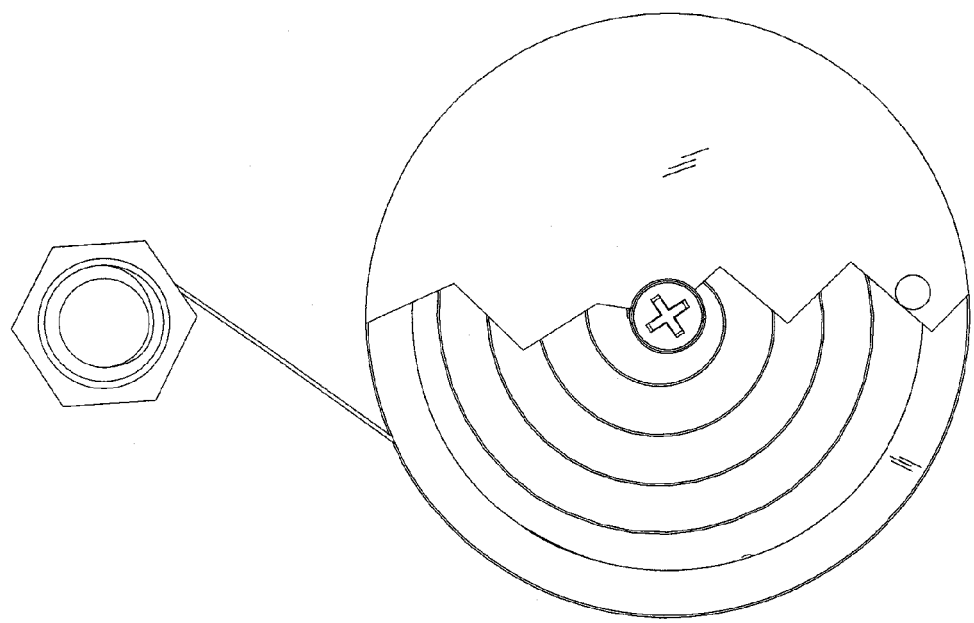
FIG. 21 depicts a top plan view of the 2-component system of FIG. 20 (with the lid of the spring-actuated component partially cut away), absent the environmental elements.
Figure 22:
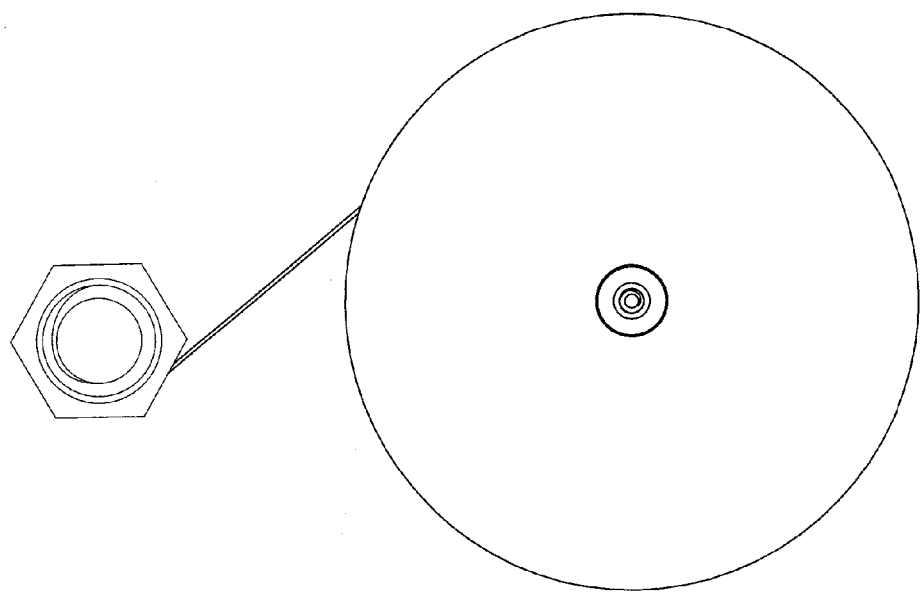
FIG. 22 depicts a bottom plan view of the system of FIG. 20, absent the environmental elements.
Figure 23:
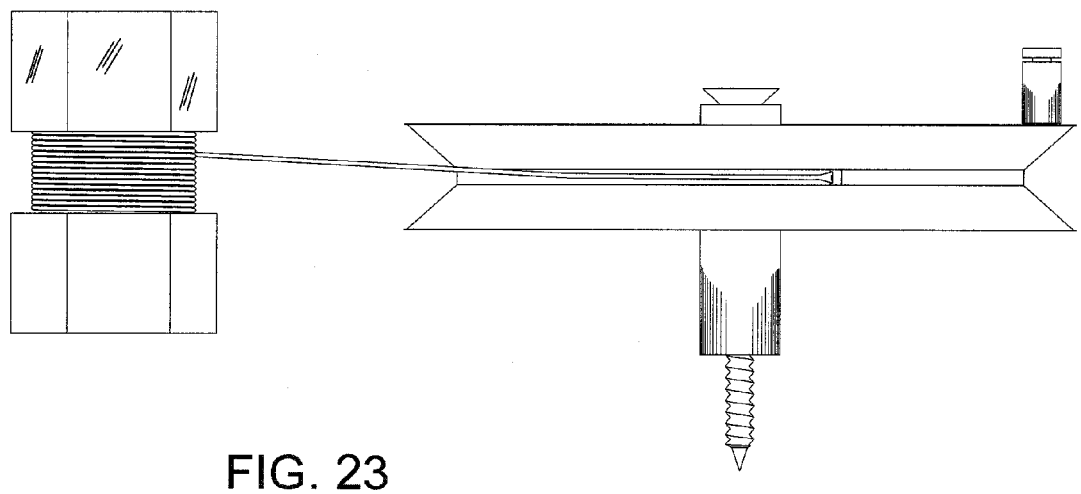
FIG. 23 depicts a first side elevation view of the system of FIG. 22.
Figure 24:
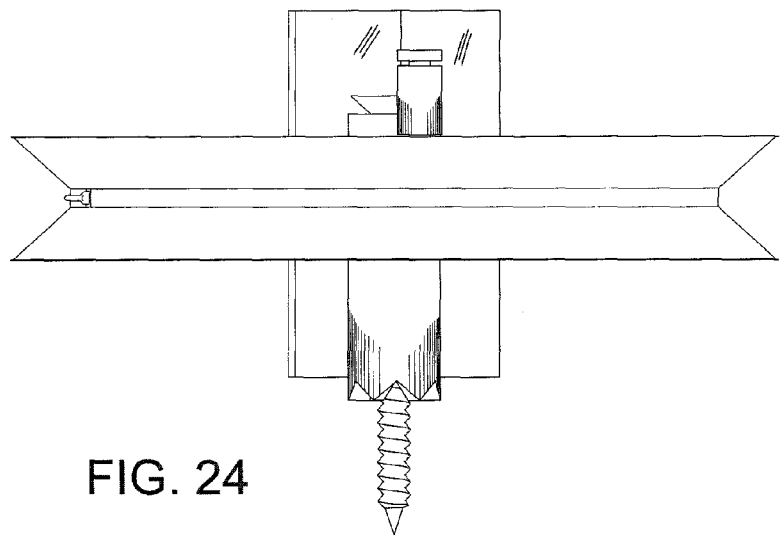
FIG. 24 depicts a second side elevation view of the system of FIG. 20, rotated 90° clockwise from the view of FIG. 22.
Figure 25:
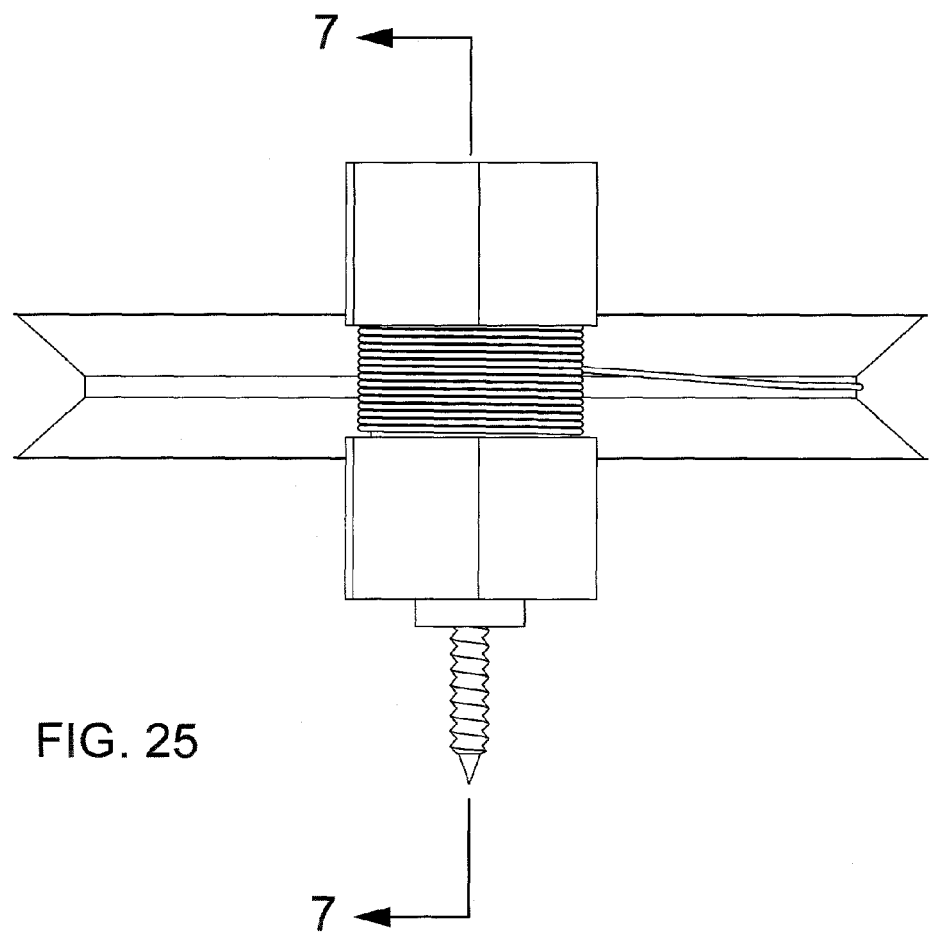
FIG. 25 depicts a third side elevation view of the system of FIG. 20, rotated 180° from the view of FIG. 24.
Figure 26:
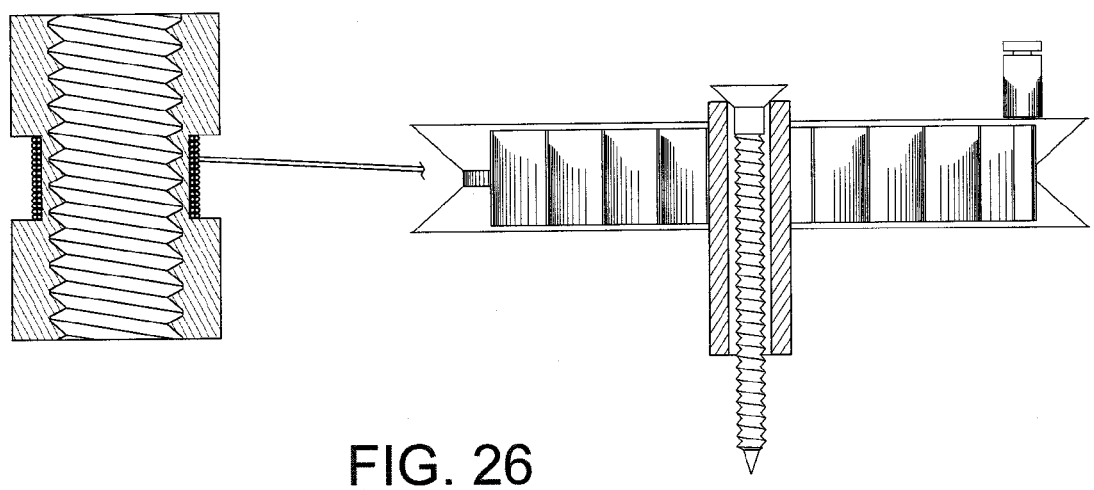
FIG. 26 depicts a cross-section view of the system of FIG. 22, at the plane shown therein.
Figure 27:
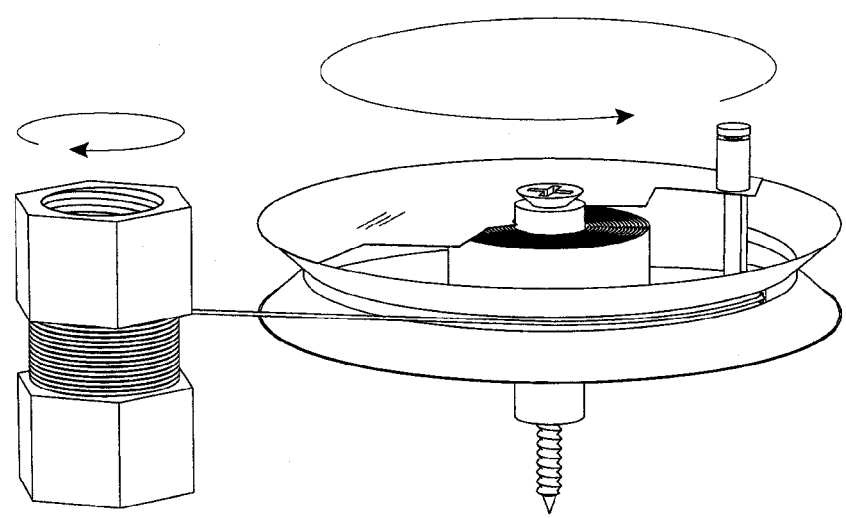
FIG. 27 depicts the system of FIG. 20, indicating a representative sample of rotation directions.
Figure 28:
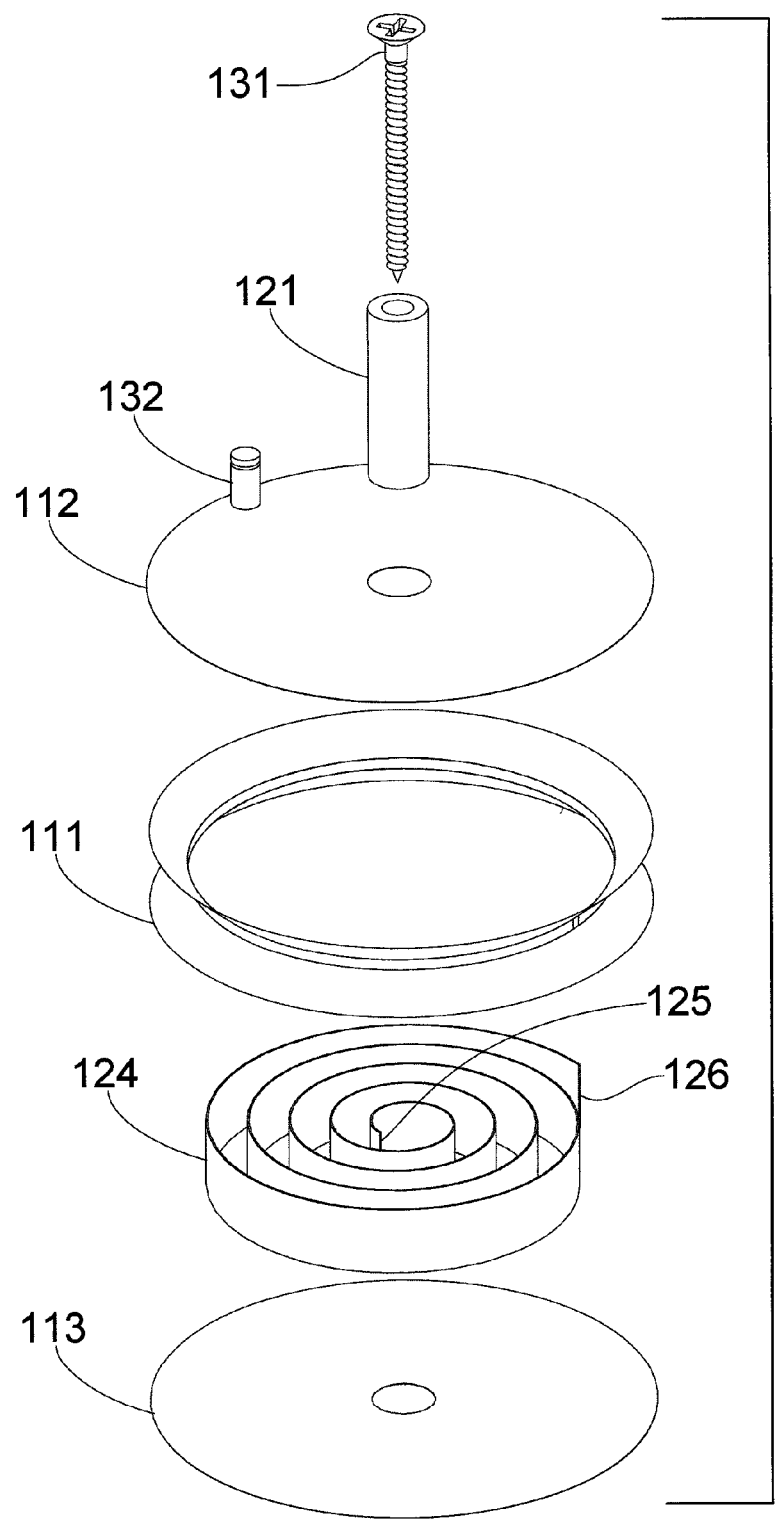
FIG. 28 depicts an exploded view of the parts of the spring-actuated component of the system of FIG. 20, absent the environmental elements. Included is a representative sample of an axle anchor (132), an axle sleeve (121), a knob (132), a housing lid (112), housing (111), recoil spring (124) with an axial end (125) and a peripheral end (126), and a housing bottom (113).

Another specific embodiment involves a tightening means separate from any fastener (nut) or coupler encompassing said fastener. (See FIGS. 20-28.) This embodiment is capable of rotating a fastener a sufficient amount to maintain a snug fastening despite substratum shrinkage or other movement of more than an inch or two. Accordingly, this embodiment may be better suited for multi-story wooden structures, or for structures expected to experience substratum shrinkage or movement of more than an inch or two. The invention disclosed herein includes a self-tightening rotary fastener system for maintaining a snug fastening for substratum using an externally threaded fastening member, said fastener system comprising:

(a) an internally threaded fastener means (122, such as a nut) rotationally engageable with the fastening member (such as a threaded bolt);

(b) a tightening means for supplying rotational force for said fastener means; and (c) a rotator means (100) for applying said rotational force to said fastener means. Said fastener means may include a nut including a means for retaining said rotator means wound around said nut. Said tightening means may include an anchor means for anchoring a rotatable housing (111); one example of an anchor means is a screw (131) for anchoring the housing to the substratum, such as a wooden structural member. The housing includes a recoil spring (124) for supplying rotational force for said fastener means.

The anchor means further may include an anchored axle portion (121) around which said housing rotates, said recoil spring having an axial end (125) anchored to said axle portion and a peripheral end (126) attached within said housing at a peripheral portion thereof, said rotation causing said recoil spring to coil tighter into a more tightly coiled state. Any form of anchoring or attachment will suffice, such as welding, adhesion, or clamping of the peripheral end between the inner housing wall and the pin attaching the knob (132) to the housing.

In one example, the axle portion may essentially be a cylinder, impaled by a screw anchored into the substratum.

The cylinder may include a rim contacting the substratum; and the rim may be adapted to reduce or prevent rotation of said axle portion. For example, the rim may pointed pins or teeth (not shown), capable of anchoring into the substratum when the anchor screw is tightly screwed down.

The rotator means may include an elongate linkage member having a first end attached to said means for retaining said rotator means, and a second end attachable to an external periphery of said housing. The elongate linkage member may be selected from the group consisting of wire, cord, string, strapping, banding and belting, and combinations thereof. Any linkage member may be used so long as it satisfies the structural and functional requirements of applying the rotary torque to the nut, for rotary tightening.

The means for retaining said rotator means wound around said nut may be selected from the group consisting of a groove, channel and other form of converging or concave circumferential adaptation around the outer surface of said nut, and combinations thereof. Any such means may be used so long as it satisfies the structural and functional requirements of retaining the wound linkage member around the fastener, or otherwise hindering unwinding of the linkage member by the tightening means.

The housing may further include a means for retaining said elongate linkage member to be wound around the external periphery of said housing With said elongate linkage member wound around said nut, and with said recoil spring coiled into a tightened state, attachment of said second end of said elongate linkage member to said means for retaining said rotator means around the external periphery of said housing, applies rotational force to rotate said nut as needed to maintain a snug fastening for the substratum using an externally threaded fastening member.

The system may also include a guide means directing said elongate linkage member onto said housing. The guide means may include a guide having one end anchored to said anchor means and a second end adapted to capture said elongate linkage member in directional proximity to said housing. One example of such an adaptation includes an eyelet at the end of an arm attached to the axle portion or cylinder, centered near the spooling groove of the housing and having the elongate linkage member threaded through the eyelet. Any adaptation may suffice so long as it satisfies the guidance/directional function of assuring that the elongate linkage member spools around the housing, or otherwise prevents the elongate linkage member from hindering the tightening of the fastener.

In one specific embodiment of the self-tightening rotary fastener system for maintaining a snug fastening for substratum having a threaded bolt transversing therethrough, said fastener system may include:

(a) an internally threaded fastener means may include a nut rotationally engageable with the bolt, said nut including an outer channel essentially perpendicular to the axis of the bolt;

(b) a tightening means for supplying rotational force for said nut, may include an anchor screw for anchoring said tightening means to the substratum, an axle portion rotataby impaled by said anchor screw and carrying a housing having a converging circumferential wall and housing a recoil spring having an axial end anchored to said axle portion and a peripheral end attached within said housing at a peripheral portion thereof, and including a knob facilitating rotation of said housing causing said recoil spring to coil tighter into a tightened state; and (c) a rotator means may include an elongate linkage member having a first end attached to said outer channel of said nut and a second end attachable to said converging circumferential wall. The rotator means may include an elongate linkage member selected from the group consisting of wire, cord, string, strapping, banding and belting, and combinations thereof.

Besides the device described herein, the invention includes a method of using the system disclosed hereinabove, including the steps of:

(a) screwing onto the externally threaded fastening means the nut having a means for retaining said rotator means and having said rotator means wound therearound;

(b) rotatably anchoring said tightening means an optimal distance from the nut;

(c) rotating the housing until the recoil spring is in a tightly coiled state; and (d) attaching the second end of the tightening means to the external periphery of the housing.

The invention disclosed herein also includes a method of using a self-tightening rotary fastener comprising:

(a) an internally threaded fastener means may include an axle portion for carrying said tightening means, and being rotationally engageable with the fastening member;

(b) a tightening means may include a recoil spring having an axial end anchored to said fastener means, and a peripheral end attached at a peripheral portion of a spring housing rotatably carried upon said axle portion, rotation of said housing or counter-rotation of said fastener means causing said recoil spring to coil tighter into said tightened state; and (c) a stop means for preventing counter-rotation of said tightening means in a tightened state. Said method may include the steps of:

(1) rotating said housing or counter-rotating said fastener means until said recoil spring is tightly coiled;

(2) positioning said stop means to prevent counter-rotation of said tightening means; and (3) screwing said internally threaded fastener means onto the end of the externally threaded fastening member until snug.

Also disclosed is a method of using a device for tightening the nut on the threaded rod for maintaining a tight connection between the structural element(s) anchored by the nut and rod, said device comprising:

(a) a coupling means may include a coupling portion defining a coupling cavity snugly accepting the nut on the threaded rod, and may include an axle portion and a chocking portion;

(b) a tightening rotation means may include a recoil spring within a housing rotatably carried upon said axle portion, said spring having an axial end anchored to said axle portion, and a peripheral end attached to a peripheral portion of said housing, said housing having a yoke on its outward surface;

(c) a chocking means for chocking counter-rotation of said rotation means, may include a chock-pin travelable through said yoke and engageable with said chocking portion of said coupling means; and (d) a stop means for preventing counter-rotation of said rotation means, may include a stanchion upstanding from the structure and engageable with said rotation means. Said method may include the steps of:

(1) rotating said housing or counter-rotating said coupling means until said recoil spring is tightly coiled;

(2) positioning said chocking means to prevent counter-rotation of said coupling means; and (3) positioning said coupling cavity to snugly accept the nut rotatably engaged on the end of the rod. The method may include the further steps of:

(4) engaging said stop means with said device; and (5) unchocking said chock means.

I claim:

1. A self-tightening rotary fastener system for maintaining a snug fastening for substratum using an externally threaded fastening member, said fastener system comprising:
   (a) an internally threaded fastener means rotationally engageable with the fastening member;
   (b) a tightening means for supplying rotational force for said fastener means; and
   (c) a rotator means for applying said rotational force to said fastener means, including an elongate linkage member having a first end attached to said means for retaining said rotator means, and a second end attachable to an external periphery of said housing.

2. The system of claim 1, wherein:
   (a) said fastener means comprising a nut including a means for retaining said rotator means wound around said nut;
   (b) said tightening means comprising an anchor means for anchoring a rotatable housing including a recoil spring for supplying rotational force for said fastener means.

3. The system of claim 2, said elongate linkage member selected from the group consisting of wire, cord, string, strapping, banding and belting, and combinations thereof.

4. The system of claim 2, said means for retaining said rotator means wound around said nut selected from the group consisting of a groove, channel and other form of converging or concave circumferential adaptation around the outer surface of said nut, and combinations thereof.

5. The system of claim 2, said anchor means further comprising an anchored axle portion around which said housing rotates, said recoil spring having an axial end anchored to said axle portion and a peripheral end attached within said housing at a peripheral portion thereof, said rotation causing said recoil spring to coil tighter into a more tightly coiled state.

6. The system of claim 5, said housing further comprising a means for retaining said elongate linkage member to be wound around the external periphery of said housing, wherein, with said elongate linkage member wound around said nut, and with said recoil spring coiled into a tightened state, attachment of said second end of said elongate linkage member to said means for retaining said rotator means around the external periphery of said housing, applies rotational force to rotate said nut as needed to maintain a snug fastening for the substratum using an externally threaded fastening member.

7. The system of claim 6, said means for retaining said rotator means to be wound around the external periphery of said housing selected from the group consisting of a groove, channel and other form of converging or concave circumferential adaptation around the outer surface of said housing, and combinations thereof.

8. The system of claim 5, said housing further comprising an outstanding means for facilitating the rotation of said housing.

9. The system of claim 8, said outstanding means for facilitating said rotation comprising a knob on said housing.

10. The system of claim 5, said axle portion further comprising a rim contacting the substratum, said rim adapted to reduce or prevent rotation of said axle portion.

11. The system of claim 2, further comprising a guide means directing said elongate linkage member onto said housing.

12. The system of claim 11, said guide means comprising a guide having one end anchored to said anchor means and a second end adapted to capture said elongate linkage member in directional proximity to said housing.

13. A self-tightening rotary fastener system for maintaining a snug fastening for substratum having a thread-ended bolt transversing therethrough, said fastener system comprising:
   (a) an internally threaded fastener means comprising a nut rotationally engageable with the bolt, said nut including an outer channel essentially perpendicular to the axis of the bolt;
   (b) a tightening means for supplying rotational force for said nut, comprising an anchor screw for anchoring said tightening means to the substratum, an axle portion rotataby impaled by said anchor screw and carrying a housing having a converging circumferential wall and housing a recoil spring having an axial end anchored to said axle portion and a peripheral end attached within said housing at a peripheral portion thereof, and including a knob facilitating rotation of said housing causing said recoil spring to coil tighter into a tightened state; and
   (c) a rotator means comprising an elongate linkage member having a first end attached to said outer channel of said nut and a second end attachable to said converging circumferential wall.

14. The system of claim 13, said rotator means comprising an elongate linkage member selected from the group consisting of wire, cord, string, strapping, banding and belting, and combinations thereof.

* * * * *